US008886244B2

(12) United States Patent
Miller et al.

(10) Patent No.: US 8,886,244 B2
(45) Date of Patent: Nov. 11, 2014

(54) METHOD AND APPARATUS FOR ENSURING CRITICAL RESOURCE ALLOCATION FOR GROUP CALLS MADE IN A PUSH-TO-TALK COMMUNICATION ENVIRONMENT

(75) Inventors: Trent J. Miller, West Chicago, IL (US); Ethan Y. Chen, Wilmette, IL (US); Wei Mao, Palatine, IL (US); Francesca Schuler, Palatine, IL (US); Steven E. Vanswol, Lombard, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 398 days.

(21) Appl. No.: 13/289,074

(22) Filed: Nov. 4, 2011

(65) Prior Publication Data

US 2013/0115995 A1 May 9, 2013

(51) Int. Cl.
*H04B 7/00* (2006.01)
*H04W 4/10* (2009.01)
*H04W 76/00* (2009.01)

(52) U.S. Cl.
CPC .............. *H04W 4/10* (2013.01); *H04W 76/005* (2013.01)
USPC ............................ 455/518; 455/418; 370/277

(58) Field of Classification Search
USPC ....................................................... 455/518
See application file for complete search history.

(56) References Cited

U.S. PATENT DOCUMENTS

| 7,751,841 | B2 | 7/2010 | Sung et al. |
| 7,929,472 | B2 | 4/2011 | Gu et al. |
| 7,929,475 | B2 | 4/2011 | Simonson et al. |
| 7,974,650 | B2 | 7/2011 | Chowdhury et al. |
| 2009/0005100 | A1 | 1/2009 | Copeland |
| 2010/0330973 | A1* | 12/2010 | Miller et al. ................. 455/418 |
| 2013/0315110 | A1* | 11/2013 | Razdan et al. ............... 370/277 |

FOREIGN PATENT DOCUMENTS

| EP | 2009936 A1 | 12/2008 |
| EP | 2066090 A1 | 6/2009 |
| WO | 2009121406 A1 | 10/2009 |
| WO | WO 2009121406 A1 * | 10/2009 ............ H04W 4/10 |

OTHER PUBLICATIONS

Allen, A. et al, "The P-Answer-State Header Extension to the Session Initiation Protocol for the Open Mobile Alliance Push to Talk over Cellular".—Network Working Group—RFC 4964—Sep. 2007.
Garcia-Martin, M., A Session Initiative Protocol (SIP) Event Package and Data Format for Various Settings in Support for the Push-to-Talk over Cellular (PoC) Service.—Network Working Group—RFC 4354—Nokia. Jan. 2006.
W. Marshall, "Private Session Initiation Protocol (SIP) Extensions for Media Authorization"—Network Working Group—RFC 3313—Jan. 2003.

(Continued)

*Primary Examiner* — Ajibola Akinyemi
(74) *Attorney, Agent, or Firm* — Steven A. May

(57) ABSTRACT

Critical resource data (192) required for a group call can be identified. Controlling (115) and secondary (155) PTT communications systems can communicate using an expanded network-to-network interface (NNI) (140). Allocation of identified critical resources (150) can be requested (145) for the group call from the secondary PTT communications system (155). In response to a successful allocation of the requested critical resources by the secondary PTT communications system, the group call can be authorized by the controlling PTT communications system (115). The allocated critical resources of the secondary PTT communications system (155) can be used to establish the group call.

21 Claims, 5 Drawing Sheets

(56) References Cited

OTHER PUBLICATIONS

J. Polk et al, Quality of Service (QoS) Mechanism Selection in the Session Description Protocol (SDP)Network Working Group—RFC 5432—Mar. 2009.

Schulzrinne, H., "Communications Resource Priority for the Session Initiation Protocol (SIP)," Network Working Group, RFC 4412, Feb. 2006.

International Search Report with Written Opinion, mailing date Jan. 2, 2013, to corresponding PCT/US2012/060820 Application—14 pages.

* cited by examiner

METHOD AND APPARATUS FOR ENSURING CRITICAL RESOURCE ALLOCATION FOR GROUP CALLS MADE IN A PUSH-TO-TALK COMMUNICATION ENVIRONMENT

FIELD OF THE DISCLOSURE

The present disclosure relates generally to push-to-talk (PTT) communications systems, and more particularly to ensuring critical resource allocation for group calls made in a heterogeneous PTT communications environment.

BACKGROUND

Wireless communications, specifically push-to-talk (PTT) communications, have been and continue to be a critical tool used by public safety officers to coordinate and communicate. As wireless communications technology has advanced (e.g., digital radio systems, broadband communications, voice over Internet Protocol (VoIP), etc.), the overall public safety communications system environment has become diversified, prompting the development and adoption of standardized network-to-network interfaces (NNIs).

A NNI defines the basic messaging and procedures for establishing and handling communications between disparate or separate communications systems. This allows a public safety officer to continue communicating with other members of the team while roaming or to attach their PTT communications device, called a subscriber unit, to a foreign communications system when on assignment.

As it stands, current NNIs address the basic infrastructure necessary to establish a call between subscriber units—mobility management, call control, and transmission control. While this is sufficient for calls made by the general public, the communications of public safety officers are typically deemed to be of priority and, therefore, the availability of the resources critical to conduct their communications should be ensured. The ability to ensure the allocation of critical resources by a second communications system is lacking in current NNIs.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
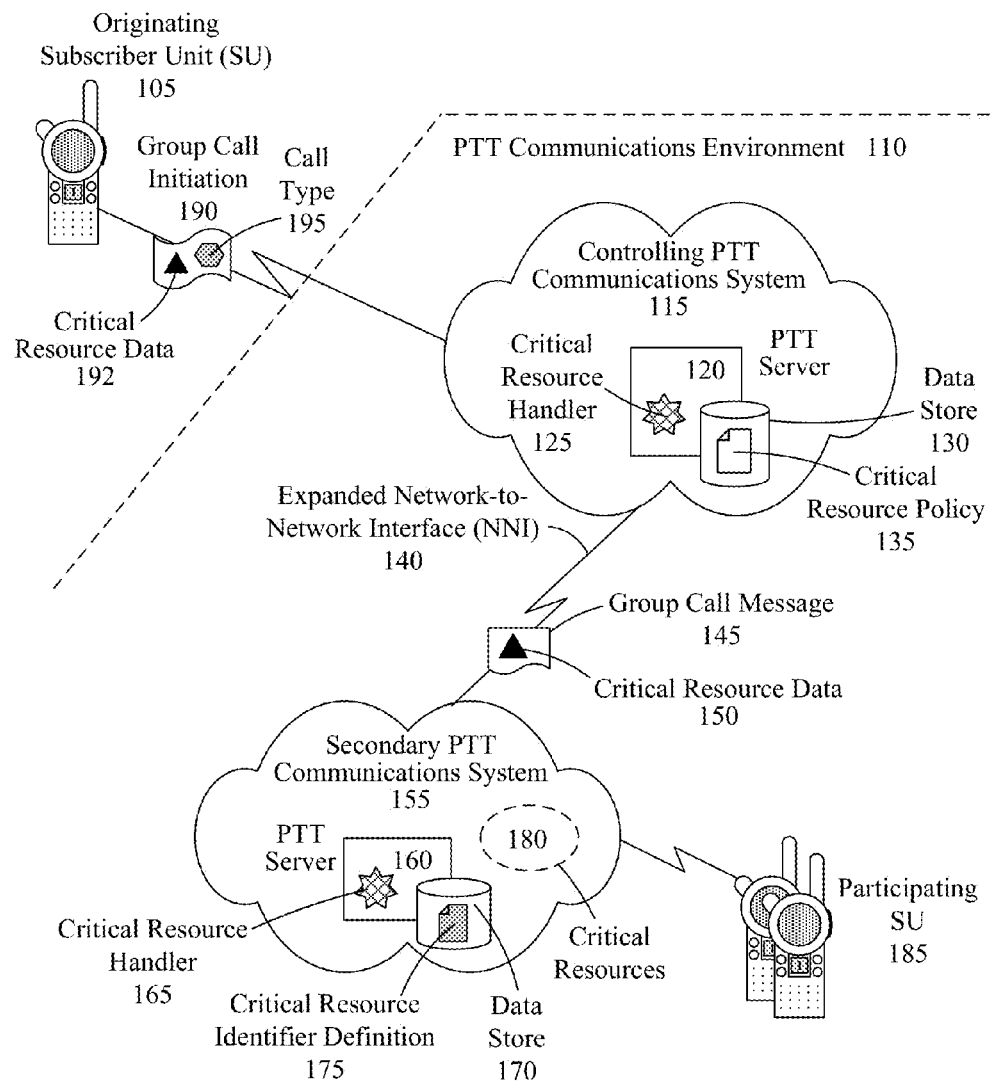
FIG. 1 is a block diagram of a system for ensuring the allocation of the critical resources within a push-to-talk (PTT) communications environment for a group call in accordance with embodiments of the inventive arrangements disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the invention address ensuring critical resource availability in a push-to-talk (PTT) communications environment. An expanded network-to-network interface (NNI) is used to exchange critical resource data between PTT communications systems in order to coordinate the allocation of the critical resources required for a group call.

FIG. 1 illustrates a schematic diagram of a system 100 for ensuring the allocation of the critical resources 180 within a push-to-talk (PTT) communications environment 110 for a group call in accordance with embodiments of the inventive arrangements disclosed herein. In system 100, an originating subscriber unit (SU) 105 can establish a group call with participating SUs 185 using the PTT communications environment 110.

The originating SU 105 and participating SUs 185 can represent a variety of electronic devices, such as a two-way radio or cell phone, that are capable of communicating via the PTT communications environment 110 using a PTT mechanism.

The PTT communications environment 110 can represent a communications environment comprised of multiple PTT communications systems 115 and 155 that are interlinked to each other through the use of one or more expanded network-to-network interfaces (NNIs) 140 to provide greater service coverage. Although only two PTT communications systems 115 and 155 are shown in system 100, it should be noted that the PTT communications environment 110 can be comprised of a multitude of PTT communications systems 115 and 155 arranged in a variety of configurations.

The operation and functionality of a PTT communications environment 110 is well known in the art, and, therefore, only those points relevant to the present invention shall be discussed herein.

In system 100, the PTT communications environment 110 can include a controlling PTT communications system 115 and a secondary PTT communications system 155. While these are both PTT communications systems 115 and 155, a distinction can be made in terms of the role that the controlling PTT communications system 115 plays and the secondary PTT communications system 155 plays in the context of resource allocation.

The controlling PTT communications system 115 can represent the PTT communications system that is the home system of the subscriber group to which the originating SU 105 belongs. Therefore, the controlling PTT communications system 115 can be in charge of or control functions related to the group call (e.g., establish, terminate, QoS, etc.).

As shown in system 100, the originating SU 105 can connect to the PTT communications environment 110 directly through the controlling PTT communications system 115. Alternately, the originating SU 105 can connect using an intermediary PTT communications system (not shown) that relays message traffic between the originating SU 105 and the controlling PTT communications system 115 without affecting the functionality of the present invention.

The secondary PTT communications system 155 can represent a PTT communications system whose service is required to establish the group call with one or more participating SUs 185. The secondary PTT communications system 155 can include critical resources 180 that represent hardware and/or software components of the secondary PTT communications system 155 that are necessary to establish a communications pathway to one or more participating SUs 185. Examples of critical resources 180 can include, but are not limited to, users, devices, sites, cells, sectors, servers, applications, roles (e.g. detectives), group identifiers, a designation of an area, specifically identified resources, unicast resources, broadcast resources, multi-cast resources, bearers, Quality of Service, all users/devices within an area, all user/device within a radius of the originator, and the like. Critical resources may be expressed as a list of one or more resources of the same type (e.g. a list of devices) or as a mixed list of several of the previously identified examples (e.g. "all detectives within ¼ mile of the originator.").

The secondary PTT communications system 155 can utilize the same or different communications technology as the controlling PTT communications system 115. For example, the controlling PTT communications system 115 can be a typical land-mobile radio (LMR) system and the secondary PTT communications system 155 can be an Open Mobile Alliance (OMA) Push-to-Talk over Cellular (PoC) system, or vice versa. Examples of PTT technologies used by the controlling and/or secondary PTT communications systems 115 and 155 can include, but are not limited to, OMA PoC, APCO P25, LMR conventional, Dimetra, commercial cellular technology (e.g., iDEN), and the like.

Conventionally, the controlling and secondary PTT communications systems 115 and 155 can establish the necessary communication pathways using a NNI, such as the Open Mobile Alliance (OMA) push-to-talk over cellular (PoC) NNI, the Telecommunications Industry Association (TIA) inter-RF subsystem interface (ISSI) NNI, Radio over IP (RoIP), the session initiation protocol (SIP) NNI, proprietary NNIs (e.g., iDEN technology), and the like. As it is known in the art, these NNIs can provide the basis for interoperability and data exchanges between the PTT communications systems 115 and 155.

The expanded NNI 140 of system 100 can be a version of a basic NNI that has been modified to include messaging and procedural components for handling the allocation of critical resources 180 from the secondary PTT communications system 155. That is, by using the expanded NNI 140, the controlling PTT communications system 115 can ensure that the critical resources 180 are available and allocated by the secondary PTT communications system 155 to establish a group call.

This technique can be of great importance in the mission critical setting of public safety, where the unavailability of critical resources 180 can be a matter of life or death. This approach can elevate the handling of mission critical communications like those of public safety when the participating SUs 185 are being serviced by a high-volume secondary PTT communications system 155 that may not be dedicated for public safety use, such as a broadband communication system 155, without requiring large-scale changes to either the controlling or secondary PTT communications systems 115 and 155.

The following are examples of messaging elements that can be included in the expanded NNI 140. It should be noted that the messages 145 discussed in these examples already exist and can be exchanged between the controlling and secondary PTT communications systems 115 and 155 in accordance with conventional NNIs.

The group call initiation message 190 can be sent by the originating SU 105 to the controlling PTT communications system 115 to start a group call. Using the expanded NNI 140, a user of the originating SU 105 can configure the group call initiation message 190 to include critical resource data 150 and/or a call type 195.

The critical resource data 192 can be a list of people and/or devices from a user's perspective that are to be included in the group call. For example, the critical resource data 192 can specify participating SUs 185 by name (e.g., John Smith, Engine 22), role (e.g., all detectives), and/or location (e.g., within four blocks of my location). It is important to note that the critical resource data 192 of the group call initiation message 190 can differ from the critical resource data 150 of the group call message 145.

The call type 195 can be a user-configurable parameter to express the criticality of the inclusion of the critical resource data 192 and/or participating SUs 185 of the secondary PTT communications system 155. For example, a user may select a "Fast Start" call type 195 to indicate that the group call should begin as soon as any of the participating SUs 185 are available and other participating SUs 185 can be added as they become available. In another example, a user can select an "All Start" call type 195 to indicate that the group call should not commence unless all identified critical resource data 192 (i.e., all designated users) are available.

The group call messages 145 exchanged between the controlling and secondary PTT communications systems 115 and 155 to establish the group call can be modified to include critical resource data 150. The critical resource data 150 can include elements that allow the controlling PTT communications system 115 to specify critical resources 180 that are to be allocated for the group call and the secondary PTT communications system 155 to provide a disposition to the controlling PTT communications system 115 regarding the availability of the requested critical resources 180. Specific examples of critical resource data 150 can include, but are not limited to, users, user equipment, sites, cells, sectors, servers, multi-cast resources, broadcast resources, uni-cast resources, quality of service (QoS) level of bearers, and the like.

Implementation of the expanded NNI 140 can be embodied by a critical resource handler 125 and 165 of the PTT server 120 and 160 of the controlling and secondary PTT communications systems 115 and 155, respectively. The PTT server 120 and 160 can represent the primary PTT server for each PTT communications system 115 and 155. The PTT server 120 and 160 can be configured with the functionality to identify critical resources 180, as is available in conventional PTT communications systems 115 and/or 155.

The critical resource handler 125 and 165 can be the component of the PTT server 120 and 160 that implements the additional functionality of the expanded NNI 140. The specific functionality performed by the critical resource handler 125 and 165 can be dependent on whether its PTT communications system 115 or 155 is in the controlling or secondary role.

The critical resource handler 125 of the controlling PTT communications system 115 can perform those operations pertinent to requesting and assessing the availability of critical resources 180 in the secondary PTT communications system 155. For example, the critical resource handler 125 can modify the group call message 145 to contain critical resource data 150 that identifies the critical resources 180 for the group call and assess the availability status of the critical resources 180 contained in the responsive group call message 145.

Identification of the critical resources 180 can be expressed in a by-value and/or by-reference format. The by-value format can explicitly identify each critical resource 180, whereas the by-reference format can utilize general identifiers that can be independently interpreted and correlated to the specific critical resources 180 of the secondary PTT communications system 155.

Additionally, multiple elements of critical resource data 150 can be used in concert to specify a critical resource 180. For example, the critical resource data 150 can include an identifier for the participating SU 185 and a QoS level for the bearer between the participating SU 185 and the secondary PTT communications system 155.

In another contemplated embodiment, the critical resource handler 125 of the controlling PTT communications system 115 can be configured to also handle identification and/or allocation of the critical resources (not shown) local to the controlling PTT communications system 115.

It should be noted that the request for roaming participating SUs 185, when supported, can be unaffected by these methods for identifying the critical resources 180. That is, a roaming participating SU 185 can be explicitly identified by its appropriate address.

It is important to emphasize that the concept of exchanging critical resource data 150 between the controlling and secondary PTT communications systems 115 and 155 can represent an approach that is distinct from that taught in RFC 4412. RFC 4412 can teach the use of an identifier in the header of a session-initiated protocol (SIP) message to explicitly express a priority for using SIP resources. Using RFC 4412, a specific resource of the communications system supporting the SIP message traffic cannot be specified to be allocated for the communication session, as is taught in the present invention. Additionally, RCF 4412 teaches passing priority (e.g., a reference to a priority value) to everyone in a session, and is not able to pass priority to a subset of people in a session, which is contemplated by embodiments of the disclosure. In embodiments of the disclosure, the concepts of the present invention and RFC 4412 can be considered complementary (i.e., used in concert within the same SIP message).

The assessment of the availability status of the requested critical resources 180 by the critical resource handler 125 can be performed in accordance with a critical resource policy 135 contained in data store 130. The critical resource policy 135 can define the handling of a group call under various availability conditions of the requested critical resources 180.

For example, the critical resource policy 135 can indicate that, when one or more of the critical resources 180 are unavailable, the critical resource handler 125 should wait ten seconds and perform a second attempt to establish the group call.

The critical resource handler 165 of the secondary PTT communications system 155 can perform operations related to the availability of the requested critical resources 180. For example, the critical resource handler 165 can modify the group call message 145 that acknowledges the group call to include critical resource data 150 that expresses the availability of the requested critical resources 180.

Additionally, when the critical resources 180 are requested using the by-reference format, the critical resource handler 165 can be configured to correlate the identifiers to the specific critical resources 180 using a critical resource identifier definition 175 contained in an accessible data store 170. The critical resource identifier definition 175 can associate the critical resources 180 of the secondary PTT communications system 155 with specific identifier values.

The critical resource identifier definition 175 can represent a single instance of an overall critical resource identification schema (not shown) utilized throughout the PTT communications environment 110 in accordance with best practices. Alternately, each PTT communications systems 115 and 155 can have a critical resource identifier definition 175 created using different schemas that share common elements with respect to critical resource 180 definition. In such an example, the critical resource handler 165 can be further configured to utilize additional data contained in the critical resource identifier definition 175 to correlate like elements of the different schemas.

For example, the critical resource identifier definition 175 of the controlling PTT communications system 115 can be created using Schema A and the critical resource identifier definition 175 of the secondary PTT communications system 155 can be created using Schema B. When the secondary PTT communications system 155 receives a group call message 145, the critical resource handler 165, using the additional data of the critical resource identifier definition 175, can correlate the "Critical Resource" element 150 of Schema A with the "Key Node" element of Schema B.

As used herein, presented data stores 130 and 170 can be a physical or virtual storage space configured to store digital information. Data stores 130 and 170 can be physically implemented within any type of hardware including, but not limited to, a magnetic disk, an optical disk, a semiconductor memory, a digitally encoded plastic memory, a holographic memory, or any other recording medium. Data stores 130 and 170 can be a stand-alone storage unit as well as a storage unit formed from a plurality of physical devices. Additionally, information can be stored within data stores 130 and 170 in a variety of manners. For example, information can be stored within a database structure or can be stored within one or more files of a file storage system, where each file may or may not be indexed for information searching purposes. Further, data stores 130 and/or 170 can utilize one or more encryption mechanisms to protect stored information from unauthorized access.

Figure 2:
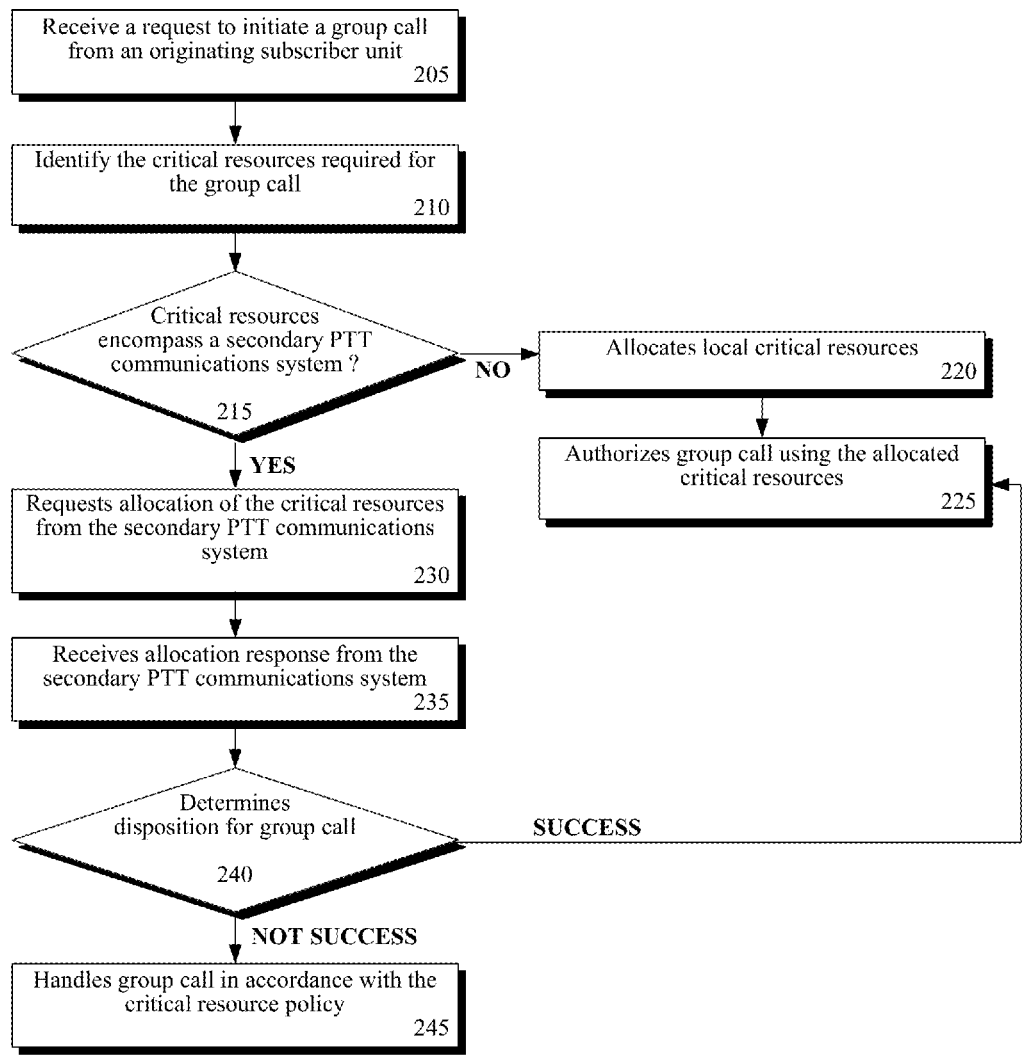
FIG. 2 is a flowchart of a method detailing actions performed by the controlling PTT communications system to ensure the allocation of critical resources of a secondary PTT communications system for a group call in accordance with embodiments of the inventive arrangements disclosed herein.

FIG. 2 is a flow chart of a method 200 detailing actions performed by the controlling PTT communications system to ensure the allocation of critical resources of a secondary PTT communications system for a group call in accordance with embodiments of the inventive arrangements disclosed herein. Method 200 can be performed within the context of system 100.

Method 200 can begin in step 205 where the controlling PTT communications system can receive a request to initiate a group call from an originating subscriber unit (SU). The PTT server can identify the critical resources required for the group call in step 210.

In step 215 it can be determined if the critical resources encompass a secondary PTT communications system. When the critical resources do not encompass a secondary PTT communications system, meaning that all the critical resources can be provided by the controlling PTT communications system, the controlling PTT communications system can allocate the local critical resources in step 220. Then, in step 225, the group call can be authorized using the allocated critical resources.

When the critical resources do encompass a secondary PTT communications system, step 230 can execute where allocation of the critical resources can be requested of the secondary PTT communications system. Step 230 can be achieved through the use of the expanded NNI to augment the NNI messages typically exchanged between the controlling and secondary PTT communications systems with additional critical resource data.

In another contemplated embodiment, the request of step 230 can be separate message, in addition to the standard message to establish communications, defined by the expanded NNI specifically for critical resource allocation.

An allocation response can be received from the secondary PTT communications system in step 235. As with step 230, the allocation response of step 235 can correspond to an expanded NNI message that contains information regarding the allocation of the requested critical resources (e.g., successfully allocated, unsuccessfully allocated, queued, etc.).

In an alternate embodiment, the allocation response of step 235 can be a separate message exchanged between the controlling and secondary PTT communications systems specifically for critical resource allocation.

Based upon the received allocation response, the disposition of the group call can be determined in step 240. The disposition of the group call can be determined in accordance with the critical resource policy and/or the call type of the group call.

When the disposition indicates NOT SUCCESS, step 245 can execute where the controlling PTT communications system can handle the group call in accordance with its critical resource policy. A NOT SUCCESS disposition can indicate situations where one or more parameters required by the critical resource policy and/or the call type of the group call have not been satisfied.

For example, an "All Start" message can result in a NOT SUCCESS disposition when any of the identified critical resources are unable to be allocated.

When the disposition indicates SUCCESS, flow of method 200 can proceed to step 220 where the controlling PTT communications system can allocate its local critical resources, if necessary. Step 225 can then be performed to authorize the group call using the allocated critical resources, from both the controlling and secondary PTT communications systems.

Method 200, as shown in FIG. 2, can address operations when creating a new group call. With minor modification, the steps of method 200 can be applied to a group call in progress. That is, as the group call occurs, the critical resource handler can identify a new critical resource that is required for the group call.

For example, an officer can be driving while participating in the group call. As the officer drives, the critical resources of the secondary PTT communications system being used can change (i.e., the servicing cell tower changes). This change can trigger performance of step 210.

Figure 3A:
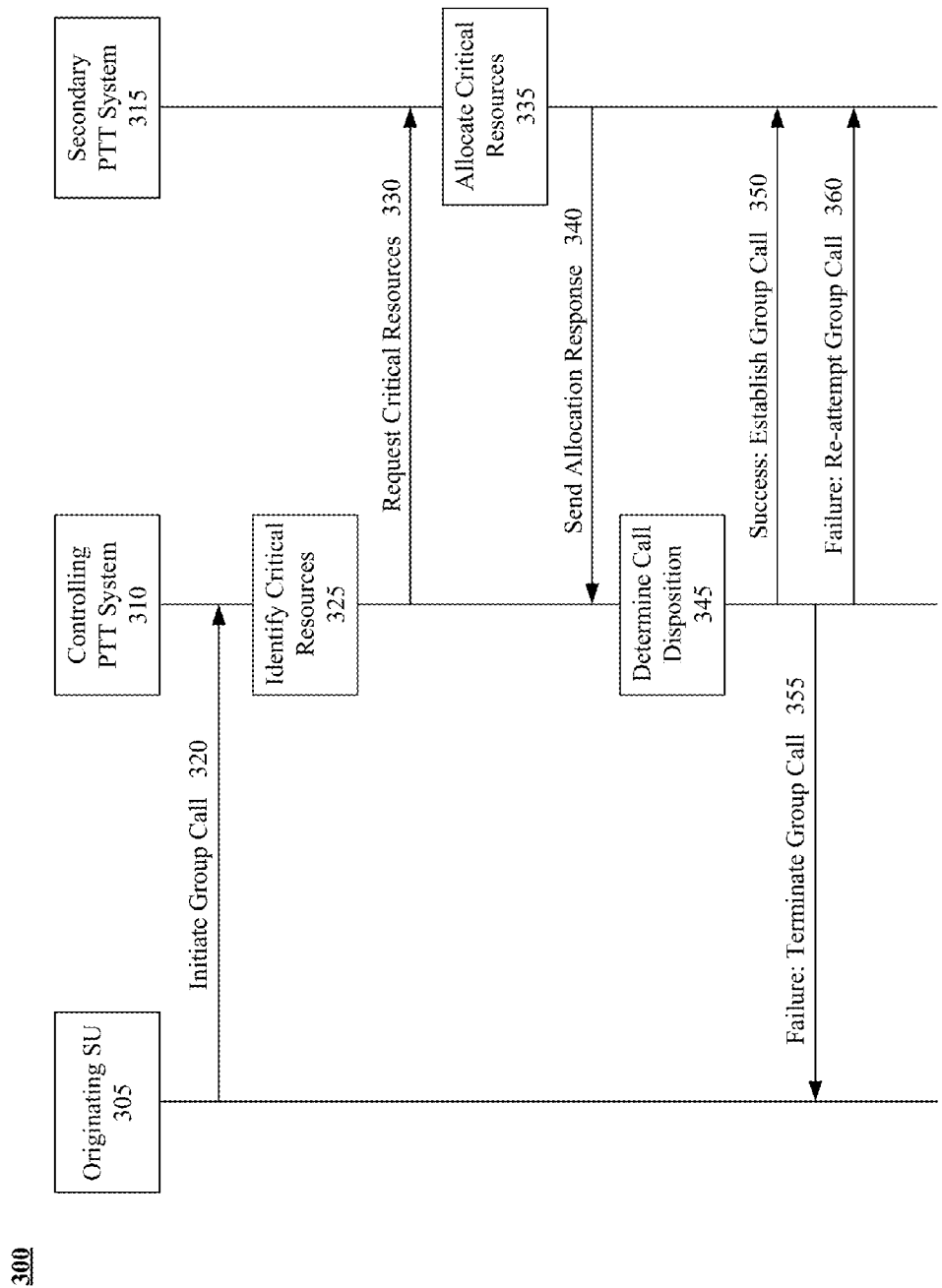
FIG. 3A depicts an interaction diagram that visually illustrates the actions performed to ensure critical resource allocation for a group call in accordance with embodiments of the inventive arrangements disclosed herein.

FIG. 3A depicts an interaction diagram 300 that visually illustrates the actions performed to ensure critical resource allocation for a group call in accordance with embodiments of the inventive arrangements disclosed herein. Interaction diagram 300 can be performed within the context of system 100 and/or in conjunction with method 200.

The components of interaction diagram 300 can include the originating SU 305, the controlling PTT communications system 310, and the secondary PTT communications system 315. Interaction between these components 305, 310, and 315 can begin when the originating SU 305 signals the controlling PTT communications system 310 to initiate 320 a group call by activating the PTT functionality (i.e., depresses the PTT button).

In one embodiment, the controlling PTT communications system 310 can then identify 325 the critical resources for the group call. In another embodiment (not shown), the originating SU 305 can identify the critical resources for the call. In such an embodiment, these resources can be conveyed as data within the message that initiates 320 the group call. Embodiments are contemplated where some critical resources are identified by the SU 305 and others are identified by the controlling PPT system 310. The controlling PTT communications system 310 can request 330 allocation of the identified critical resources that belong to the secondary PTT communications system 315.

The secondary PTT communications system 315 can attempt to allocate 330 the identified critical resources 335 for the group call. An allocation response for the request can be sent 340 to the controlling PTT communications system 310. The allocation response can contain information indicating whether or not each critical resource has been allocated to the group call like an allocation status.

As previously discussed, the allocation request and response can be included within existing messages or can represent an additional message exchange between the controlling and secondary PTT communications systems 310 and 315.

The disposition of the group call can then be determined 345 by the controlling PTT communications system 310. A successful disposition can establish 350 the group call between the controlling and secondary PTT communications systems 310 and 315. An unsuccessful disposition can result in the controlling PTT communications system 310 informing the originating SU 305 that the group call has been terminated 355 or re-attempting 360 to establish the group call with the secondary PTT communications system 315.

Figure 3B:
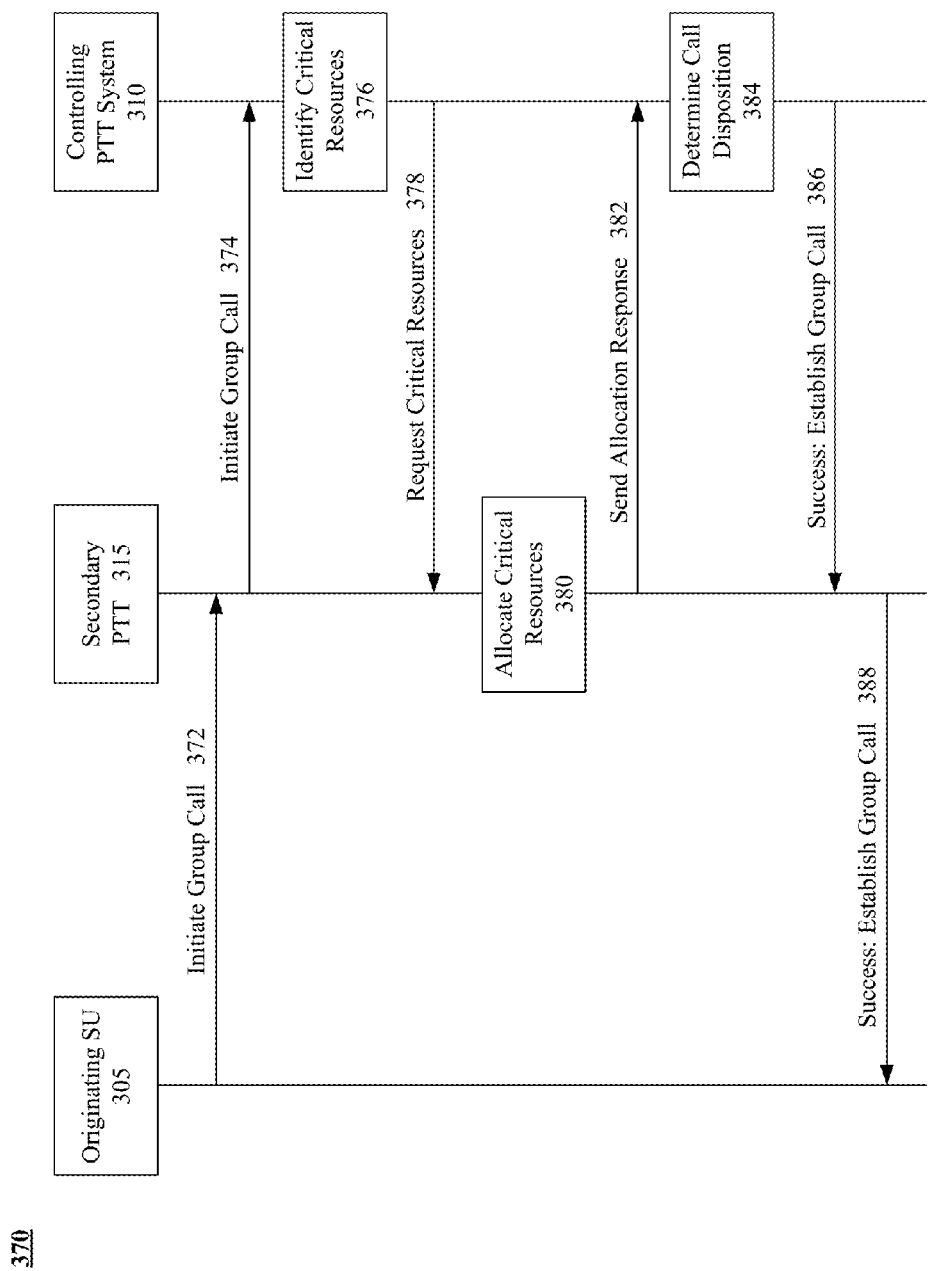
FIG. 3B depicts an interaction diagram that visually illustrates the actions performed to ensure critical resource allocation for a group call in accordance with embodiments where a secondary PPT initiates a group call.

FIG. 3B depicts an interaction diagram 370 that visually illustrates the actions performed to ensure critical resource allocation for a group call in accordance with embodiments where a secondary PPT initiates a group call. Interaction diagram 370 can be performed within the context of system 100 and/or in conjunction with method 200.

In diagram 370, the originating SU 305 signals the secondary PTT communications system 315 to initiate 372 a group call by activating the PTT functionality (i.e., depresses the PTT button). Secondary PTT 315 then sends a message 374 to the controlling PTT system 310 for initiating the group call.

In one embodiment, the controlling PTT communications system 310 can then identify 376 the critical resources for the group call. Alternatively, critical resources can be identified by the originating SU 305 and/or the secondary PTT 315. The controlling PTT communications system 310 can request 378 allocation of the identified critical resources that belong to the secondary PTT communications system 315.

The secondary PTT communications system 315 can attempt to allocate 380 the identified critical resources for the group call. An allocation response for the request can be sent 382 to the controlling PTT communications system 310.

The allocation request and response can be included within existing messages or can represent an additional message exchange between the controlling and secondary PTT communications systems 310 and 315.

The disposition of the group call can be determined 384 by the controlling PTT communications system 310. A successful disposition can establish 386 the group call between the controlling and secondary PTT communications systems 310 and 315. Establishment of the group call involves sending 388 a success message to the originating SU 305.

Figure 4:
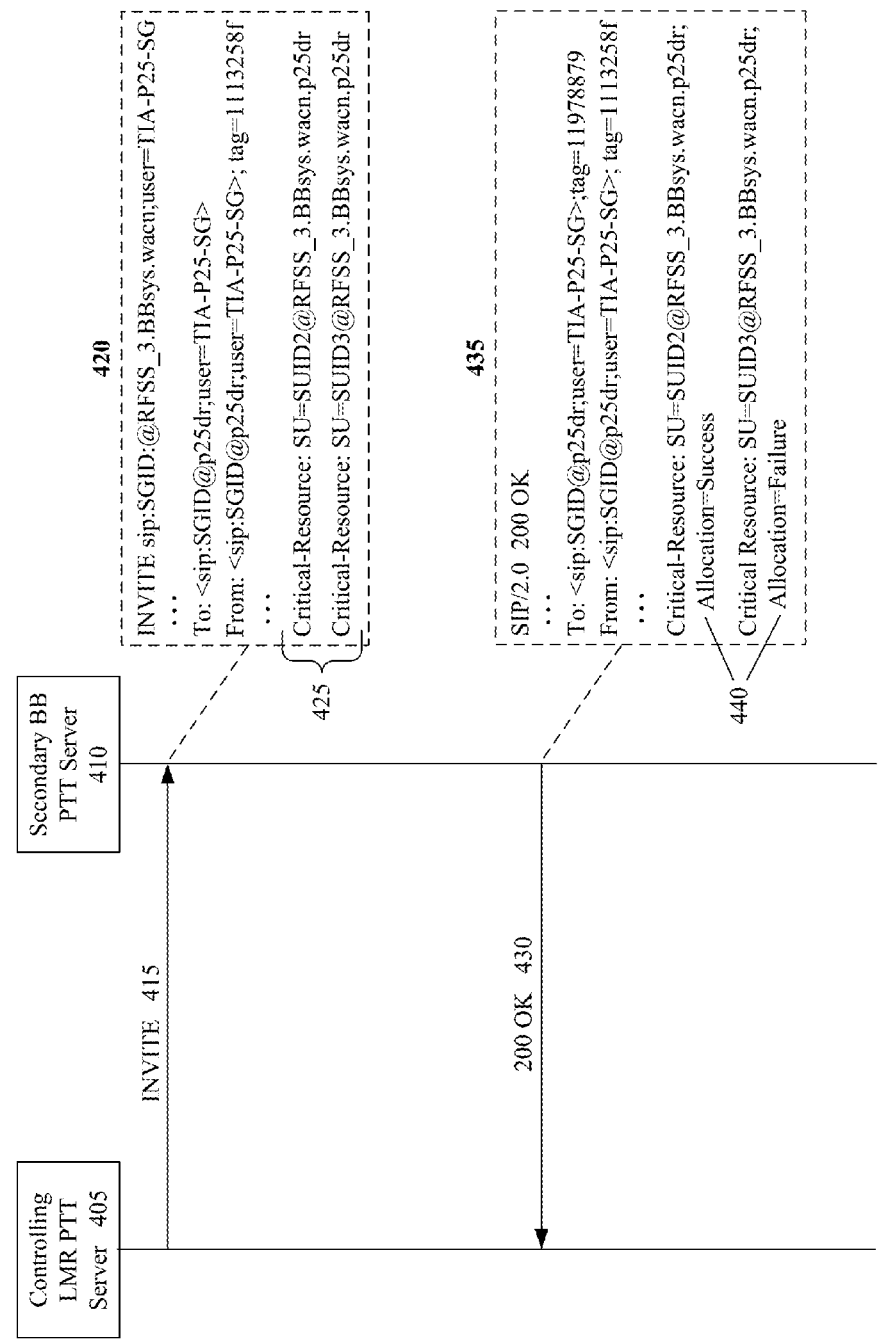
FIG. 4 is an example messaging diagram coordinating the allocation of critical resources for a subscriber unit participating in a group call using expanded ISSI Session Initiation Protocol (SIP) NNI messages in accordance with embodiments of the inventive arrangements disclosed herein.

FIG. 4 is an example messaging diagram 400 coordinating the allocation of critical resources for a subscriber unit participating in a group call using expanded ISSI Session Initiation Protocol (SIP) NNI messages 420 and 435 in accordance with embodiments of the inventive arrangements disclosed herein. Example messaging diagram 400 can be performed within the context of system 100 and/or in conjunction with method 200.

The example messaging diagram 400 can illustrate an embodiment of the present invention that utilizes the additional syntax provided by an expanded SIP NNI in the messages exchanged between a controlling LMR PTT server 405 and a secondary broadband (BB) PTT server 410.

As is typical of establishing a SIP communication session, the controlling LMR PTT server 405 can issue 415 a SIP INVITE message 420 to the secondary BB PTT server 410. The example SIP INVITE message 420 can contain the fields typically included in the header of a SIP INVITE (e.g., To, From, Call-ID, CSeq, etc.) with the addition of critical-resource fields 425. In this example, two subscriber units (SUs), SUID2 and SUID3, can be explicitly requested in a by-value format as being critical resources of the group call.

The secondary BB PTT server 410 can respond 430 to the SIP INVITE message 420 with an OK message 435, after attempting to allocate the identified critical resources. The OK message 435 can repeat the critical resource fields 425 of the SIP INVITE message 420 appended with an allocation parameter 440.

The allocation parameter 440 can indicate the status (e.g., success, failure, queued, etc.) for each critical resource when the secondary BB PTT server 410 attempted allocation. In this example, the OK message 435 can indicate that the secondary BB PTT server 410 was able to successfully allocate SUID2, but not SUID3.

From this point, the controlling LMR PTT server 405 would assess the OK message 435 and the allocation parameters 440 with the call type and/or critical resource policy to determine how to proceed with the group call.

It should be noted that the concepts illustrated in the example messaging diagram 400 can be applied to other types of SIP messages and/or transactions like PUBLISH, NOTIFY, and OPTIONS and need not be limited to the SIP INVITE message 420.

It should also be emphasized that this type of messaging can be particularly beneficial when the controlling LMR PTT server 405 and secondary BB PTT server 410 are components of a PTT communications environment that handles public safety message traffic. Expanded NNI messages 415 and 430 can facilitate communication between the PTT servers 405 and 410 to confirm allocation of the critical resources for a public safety group call, which, in turn, can ensure that public safety officers are able to communicate with each other, even when the secondary BB PTT server 410 is part of a commercial provider that handles a high volume of message traffic.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for ensuring critical resource availability in a push-to-talk (PTT) communications environment comprising:
    identifying critical resources required for a group call that belong to a secondary PTT communications system by a controlling PTT communications system that is a home system for a subscriber group to which an originating PTT subscriber unit of the group call belongs, wherein the controlling and secondary PTT communications systems are members of a PTT communications environment, wherein the controlling and secondary PTT communications systems communicate using an expanded network-to-network interface (NNI), wherein said expanded NNI represents a NNI that has been modified to encompass messaging and procedural elements supporting management of critical resource availability;
    requesting allocation of the identified critical resources for the group call from the secondary PTT communications system using the expanded NNI; and
    in response to a successful allocation of the requested critical resources by the secondary PTT communications system, authorizing of the group call by the controlling PTT communications system, wherein the allocated critical resources of the secondary PTT communications system are used in establishing the group call.

2. The method of claim 1, wherein the critical resources identified for the group call span a plurality of secondary PTT communications systems, wherein the requesting of the allocation of the critical resources and the establishing of the group call using said critical resources are performed for each secondary PTT communications system of the plurality of secondary PTT communications systems.

3. The method of claim 1, wherein requesting the allocation of the identified critical resources further comprises:
    appending of at least one critical resource identifier that represents the identified critical resources required of the secondary PTT communications system to a group call message by a critical resource handler of the controlling PTT communications system, wherein the at least one critical resource identifier and the group call message conform to the expanded NNI;
    conveying the group call message to the secondary PTT communications system;
    receiving a responsive group call message conforming to the expanded NNI from the secondary PTT communications system, wherein said responsive group call message contains availability data for the identified critical resources specified in the group call message;
    determining a disposition of the group call based upon the received responsive group call message;
    when the disposition indicates success, the group call is authorized; and
    when the disposition indicates not success, executing an action for the group call as defined in a critical resource policy of the controlling PTT communications system, wherein said action comprises at least one of terminating the group call and retrying authorization of the group call after a predetermined time interval.

4. The method of claim 3, wherein the at least one critical resource identifier utilizes at least one of a by-value format and a by-reference format, wherein the secondary PTT communications system independently interprets the by-reference format in accordance with a locally-maintained critical resource identifier definition.

5. The method of claim 1, wherein the expanded NNI comprises at least one of an expanded Open Mobile Alliance (OMA) push-to-talk over cellular (PoC) NNI, an expanded Telecommunications Industry Association (TIA) inter-RF subsystem interface (ISSI) NNI, Radio over Internet Protocol (RoIP), and an expanded session initiation protocol (SIP) NNI.

6. The method of claim 1, wherein identification of the critical resources required for the group call and requesting of the identified critical resources for the group call from the secondary PTT communications system are performed by a critical resource handler component of the controlling PTT communications system.

7. The method of claim 1, wherein said critical resources represent components of the secondary PTT communications system necessary for transmitting and receiving communications with a PTT subscriber unit of a participant of the group call that is being serviced by the secondary PTT communications system.

8. The method of claim 1, wherein the successful allocation of the identified requested critical resources is determined based upon a call type of the group call.

9. A system for ensuring critical resource availability in a push-to-talk (PTT) communications environment comprising:
    a plurality of PTT subscriber units are configured to participate in a group call;
    a plurality of expanded network-to-network interfaces (NNIs) each representing a NNI that has been modified to encompass messaging and procedural elements supporting management of critical resource availability, wherein the NNI defines basic messaging and interoperability procedures that support communications between distinct communications systems;
    a PTT communications environment comprised of a plurality of PTT communications systems interlinked using the plurality of expanded NNIs, said PTT communications environment further comprising:
        a controlling PTT communications system configured to establish the group call between a subset of the plurality of subscriber units, wherein said establishment of the group call requires use of resources of the PTT communications environment identified as critical to said establishment of the group call, wherein the controlling PTT communications system is a home system for a subscriber group to which a PTT subscriber unit originating the group call belongs;

at least one secondary PTT communications system configured to allocate critical resources supporting the group call for PTT subscriber units of the subset that the at least one secondary PTT communications system is servicing.

10. The system of claim 9, wherein the controlling PTT communications system and the at least one secondary PTT communications system are configured to utilize different communications technologies.

11. The system of claim 9, wherein the plurality of expanded NNIs comprises an expanded Open Mobile Alliance (OMA) push-to-talk over cellular (PoC) NNI, an expanded Telecommunications Industry Association (TIA) inter-RF subsystem interface (ISSI) NNI, Radio over Internet Protocol (RoIP), and an expanded session initiation protocol (SIP) NNI.

12. The system of claim 9, wherein the controlling PTT communications system further comprises:

a PTT server configured to identify the critical resources of the PTT communications environment that are required for establishing the group call, said PTT server further comprising:

a critical resource handler configured to implement the messaging and procedural elements defined in the plurality of expanded NNIs to assess an availability of the critical resources identified by the PTT server from the at least one secondary PTT communications system.

13. The system of claim 12, wherein the critical resource handler further comprises:

a critical resource policy defining a plurality of rules for handling the establishment of the group call based on the assessed availability of the critical resources.

14. The system of claim 9, wherein the plurality of expanded NNIs further comprises:

at least one critical resource identifier conforming to a syntax of an expanded NNI that expresses the critical resources required for the group call, wherein the at least one critical resource identifier references the critical resources utilizing at least one of a by-value format and a by-reference format.

15. The system of claim 14, wherein, when the expanded NNI uses the by-reference format, said at least one secondary PTT communications system further comprises:

a critical resource identifier definition that relates a value of a critical resource identifier to at least one critical resource of the at least one secondary PTT communications system.

16. The system of claim 9, wherein the critical resources allocated by the at least one secondary PTT communications system comprises at least one of hardware or software component necessary to establish a communication pathway to the PTT subscriber units.

17. A computer program product comprising a non-transitory computer readable storage medium having computer usable program code embodied therewith, the computer usable program code comprising:

computer usable program code configured to identify critical resources required for a group call that belong to a secondary PTT communications system, wherein said identified critical resources represent components of the secondary PTT communications system necessary for transmitting and receiving communications with a PTT subscriber unit of a participant of the group call that is being serviced by the secondary PTT communications system, wherein the secondary PTT communications system communicates with a controlling PTT communications system for the group call using an expanded network-to-network interface (NNI), wherein said expanded NNI represents a NNI that has been modified to encompass messaging and procedural elements supporting management of critical resource availability;

computer usable program code configured to request allocation of the identified critical resources for the group call from the secondary PTT communications system; and computer usable program code configured to, in response to a successful allocation of the identified critical resources by the secondary PTT communications system, authorize the group call by the controlling PTT communications system, wherein the allocated critical resources of the secondary PTT communications system are used in the group call, and, wherein the successful allocation of the identified critical resources is determined based upon a call type of the group call.

18. The computer program product of claim 17, wherein the critical resources identified for the group call span a plurality of secondary PTT communications systems, wherein the requesting of the allocation of the critical resources and the authorizing of the group call using said critical resources are performed for each secondary PTT communications system of the plurality of secondary PTT communications systems.

19. The computer program product of claim 17, wherein the computer usable program code to request the allocation of the identified critical resources further comprises:

computer usable program code configured to append of at least one critical resource identifier that represents the identified critical resources required of the secondary PTT communications system to a group call message by a critical resource handler of the controlling PTT communications system, wherein the at least one critical resource identifier and the group call initiation message conform to the expanded NNI;

computer usable program code configured to convey the group call message to the secondary PTT communications system;

computer usable program code configured to receive a responsive group call message conforming to the expanded NNI from the secondary PTT communications system, wherein said responsive group call message contains availability data for the identified critical resources specified in the group call message;

computer usable program code configured to determine a disposition of the group call based upon the received responsive group call message;

computer usable program code configured to, when the disposition indicates success, authorize the group call; and computer usable program code configured to, when the disposition indicates not success, execute an action for the group call as defined in a critical resource policy of the controlling PTT communications system, wherein said action comprises at least one of terminating the group call and retrying authorization of the group call after a predetermined time interval.

20. The computer program product of claim 19, wherein the at least one critical resource identifier is configured to utilize at least one of a by-value format and a by-reference format, wherein the secondary PTT communications system is configured to independently interpret the by-reference format in accordance with a locally-maintained critical resource identifier definition.

21. The computer program product of claim 17, wherein the expanded NNI comprises at least one of an expanded Open Mobile Alliance (OMA) push-to-talk over cellular (PoC) NNI, an expanded Telecommunications Industry Association (TIA) inter-RF subsystem interface (ISSI) NNI, Radio over Internet Protocol (RoIP), and an expanded session initiation protocol (SIP) NNI.

* * * * *

UNITED STATES PATENT AND TRADEMARK OFFICE
CERTIFICATE OF CORRECTION

PATENT NO. : 8,886,244 B2  
APPLICATION NO. : 13/289074  
DATED : November 11, 2014  
INVENTOR(S) : Trent J. Miller et al.

Page 1 of 1

It is certified that error appears in the above-identified patent and that said Letters Patent is hereby corrected as shown below:

IN THE SPECIFICATION:

In Column 2, Line 2, delete "PPT" and insert -- PTT --, therefor.

In Column 5, Line 47, delete "RCF 4412" and insert -- RFC 4412 --, therefor.

In Column 8, Line 17, delete "PPT" and insert -- PTT --, therefor.

In Column 8, Line 45, delete "PPT" and insert -- PTT --, therefor.

Signed and Sealed this  
Seventeenth Day of May, 2016

Michelle K. Lee  
*Director of the United States Patent and Trademark Office*